United States Patent [19]

Juracka et al.

[11] 4,379,868

[45] Apr. 12, 1983

[54] METHOD FOR PRODUCING HYDROPHILIC FILLERS FOR PLASTICS AND RUBBERS

[75] Inventors: Frantisek Juracka, Pardubice; Slavko Hudecek, Prague, both of Czechoslovakia

[73] Assignee: Ceskoslovenska akademie ved, Prague, Czechoslovakia

[21] Appl. No.: 172,426

[22] Filed: Jul. 25, 1980

Related U.S. Application Data

[63] Continuation of Ser. No. 912,202, Jun. 6, 1978, abandoned, which is a continuation-in-part of Ser. No. 691,705, Jun. 1, 1976, abandoned.

[51] Int. Cl.³ .............................................. C08L 47/00
[52] U.S. Cl. .................................. 523/201; 524/461; 526/80; 526/336
[58] Field of Search .................. 260/29.6 H, 29.6 TA, 260/29.6 N, 29.7 R, 29.7 T, 29.7 H, 29.6 RW; 526/336, 80, 87; 525/78, 80; 523/201; 524/461

[56] References Cited

U.S. PATENT DOCUMENTS

| | | | |
|---|---|---|---|
| 3,380,851 | 4/1968 | Lindemann et al. | 260/29.6 TA |
| 3,678,133 | 7/1972 | Ryan | 260/876 R |
| 3,758,429 | 9/1973 | Fallwell, Jr. | 260/29.6 TA |
| 3,971,744 | 7/1976 | Hudecek et al. | 260/30.6 R |

*Primary Examiner*—John Kight, III
*Assistant Examiner*—Amelia B. Yarbrough

[57] ABSTRACT

A new method for preparation of hydrophilic fillers has been found, based on high-molecular weight compounds insoluble in water, obtained by the copolymerization of unsaturated monomers, soluble and insoluble in water, either in the form of an aqueous emulsion containing 10-70% by wt. of fillers, or in the dry powdered form having the required particle size, which in the final application are able to sorb reversibly water vapor, and are particularly suited for producing synthetic leather and similar materials.

5 Claims, No Drawings

METHOD FOR PRODUCING HYDROPHILIC FILLERS FOR PLASTICS AND RUBBERS

RELATED APPLICATION

This is a continuation of Ser. No. 912,202, filed June 6, 1978, which in turn is a continuation-in-part of Ser. No. 691,705, filed June 1, 1976, both now abandoned.

To impart the ability of reversible sorption of water vapor to plastics (e.g., poly(vinyl chloride), polyurethane and the like) and rubbers, powdered hydrophilic fillers are used, in principle sterically crosslinked copolymers of sodium polymethacrylate and divinylbenzene or ethylenedimethacrylate (Czechoslovak Author Certificate Nos. 157 212 corresponding to U.S. application Ser. No. 496,370, and 162,921, corresponding to U.S. Pat. Nos. 3,875,261 and 3,928,704). These hydrophilic materials are prepared by precipitation polymerization in liquids being solvents for monomers, but the forming polymer is excluded from them during the polymerization in the form of irregular particles, 0.1–5 µm in size (Czechoslovak Author Certificate No. 160 338, corresponding to U.S. Pat. No. 4,027,082). The copolymer thus obtained is neutralized with an alkali solution and then either used in the form of a paste, if e.g. plasticizers for plastics are used as the precipitant (Patent Application 5087-73, corresponding to U.S. Pat. No. 3,971,744), or the medium is evaporated from the copolymer and the copolymer is ground to yield particles of the required size by using a suitable type of mill.

The above procedures of preparation of hydrophilic fillers sometimes suffer from disadvantages both in preparation and in application, as e.g. in drying the polymer there arises the problem of collecting the solvent vapors, or from difficulties related to the inflammability of the solvents, their toxicity, formation of agglomerates in drying and difficulties connected with their reproducible disintegration into particles of the required size. In the case of copolymer pastes in plasticizers for plastics a disadvantage of some applications consists in the water content in the paste after neutralization of carboxylic groups with an aqueous alkali solution, and the like.

Recently, a new method for preparation of hydrophilic fillers has been found, based on high-molecular weight compounds insoluble in water, obtained by the copolymerization of unsaturated monomers, soluble and insoluble in water, either in the form of an aqueous emulsion containing 10–70% by wt. of said fillers or in the dry powdered form having the required particle size, which in the final application are able to sorb reversibly water vapor and are particularly suited for producing synthetic leather and similar materials.

The principle of the invention consists in that the monomer or a mixture of monomers insoluble in water is first subjected to partial emulsion polymerization, after which the monomer or a mixture of water-soluble monomers, or their aqueous solution, is added to the polymerizing dispersion, whereafter after completion of polymerization the carboxylic groups are neutralized, (if desired) in the latex-dispersion thus formed.

The latex-dispersion thus formed may, after neutralization (if desired) or the carboxylic groups, be concentrated to the content of the dry matter from 20–70% by wt., with advantage from 30–60% by wt.

From the latex-dispersion formed in the reaction, after eventual neutralization of the carboxylic groups, powdered polymer can be isolated, for instance by evaporation or precipitation. According to the conditions of emulsion polymerization, the product is obtained directly in the required and predominantly uniform particle size. An important moment of procedure according to the invention consists in the fact that the method in question is a so far undescribed method of emulsion polymerization of water-soluble monomers leading to the formation of a dispersion of independent spherical polymer particles having the character of typical latexes. The procedure is based on the fact that to the dispersion of a small amount of water-insoluble monomer in water after its partial polymerization, a water-soluble monomer is regularly added. A surprising fact was that in this process no solution polymerization of the water-soluble monomer took place, because it was proved that the aqueous phase of said dispersion did not contain a dissolved linear polymer.

The water-insoluble monomer can be e.g. ethylenedimethacrylate, divinylbenzene, bis-(p-vinylphenyl)sulphone, styrene, acrylic or methacrylic acid esters, unsaturated esters of dicarbonic acids etc., or mixtures of thereof. As water soluble monomers one may use vinyl monomers with a hydrophilic group, consequently water-soluble, such as e.g. acrylic or methacrylic acid, their aminoesters or monoesters of polydric alcohols, e.g. 2-hydroxyethyl acrylate, their amides, maleic anhydride, etc.

To emulsify the water-insoluble monomer and to maintain the whole disperse system until a stable latex of the copolymer of monomers is formed, anion active, cation active or nonionogenic tensides or a combination thereof can be used in a suitable and effective concentration, such as alkanesulphonic acids, alkylarylsulphonic acids, sulphuric acid esters, e.g. sodium lauryl alcohol sulphate $C_{11}H_{23}.SO.Na$, alkylpolyethylene sulphate R $(O.C_2H_4)_n O.SO_3.Na$, $C_8H_{17}.C_6H_4.O.C_2H_4.O.C_2H_4.SO_3.Na$. Cationic, such as amine hydrochlorides, e.g. octadecylammonium chloride $C_{18}H_{37}NH_3$ Cl, quaternary ammonium compounds, e.g. cetyltrimethylammonium bromide $(C_{16}H_{33}N/CH_3/_3$-Br, dodecylpyridinium chloride, or nonionic compounds with hydrophilic groups, such as ethoxylated alkylphenoles (e.g. nonyl- or octyl-). of the type $C_9H_{19}C_6H_4.(O.C_2H_4)_nOH$, glycerol monostearates, e.g. $HO.CH_2.CH/OH/.CH_2.O.CO.C_{17}H_{35}$, ethyleneglycol or propyleneglycol monoesters, e.g. nonaethyleneglycol monooleate $C_{17}H_{35}CO.O.CH_2.CH_2.O.(C_2H_4O)_8H$, etc.

The polymerization is initiated by the usual initiators of emulsion polymerization soluble in water, such as sodium or ammonium persulphate, hydrogen peroxide, with advantage by using a redox system such as persulphate—bisulphite or thiosulphate, sometimes with acceleration of the reaction by adding ferrous sulphate to the polymerizing system.

The working conditions of the emulsion polymerization of water-insoluble and of the following water-soluble monomer are the most important factor of a successful transformation of the water-soluble monomer into a homogeneous and stable polymer dispersion. The emulsion polymerization and the obtaining of a latex from a water-soluble monomer can be achieved according to the invention by copolymerization with a water-insoluble monomer. The basic condition of a successful work is a preliminary polymerization carried out up to a certain degree of conversion (with advantage up to 40–70% of double bonds of the water-insoluble monomer) followed by a gradual and regular dosage of water-soluble monomer at a rate such that the molecules thereof can be bound on the latex particles already formed. The process that probably occurs here is grafting of molecules or of growing macromolecules of the water-soluble monomer onto macromolecules of the water-insoluble monomer. For the emulsion polymerization to be successful it is necessary that the initiation of polymerization of the water-insoluble monomer should occur sufficiently in advance of the dosage of the water-soluble monomer. Thus, there must be a time lag between the addition of the reducing component of the initiator system and the onset of dosage of the water-soluble monomer. An important role in the process is also played by the purity of the monomers used, and thus by the absence of inhibitors, polymerization retarders, and consequently of the dissolved air oxygen.

The product of copolymerization of the water-insoluble and water-soluble monomer by emulsion polymerization, wherein their mutual mass ratio can vary according to the required properties of the polymer within a range from 2:1 to 1:3 (or, stated another way, the amount of the water-soluble monomer ranges from 33 to 75 wt.% based on the total weight of monomers), and also the ratio of the organic to the aqueous phase can be used within a range 1:1 to 1:20, is a diluted, homogeneous, stable latex, which for some purposes can be used in this form. For uses in the form of a dry fine powder the latex is treated by employing the generally known procedure, such as e.g. drying on an atomizer.

The product obtained by drying and prepared by the procedure according to the invention is a fine hygroscopic powder capable of reversible sorption of the water vapor, in the form of particles predominantly spherical in shape, size 0.05–10 μm.

The object of the invention is illustrated by examples which in no way restrict the extent of its validity. The parts and percent amounts given in the Examples are meant as mass parts and mass percent amounts.

EXAMPLE 1

Into a reactor with a stirrer, thermometer, reflux condenser and nitrogen inlet, a solution of 0.72 parts of a 40% aqueous solution of sodium dodecyldiphenyloxide disulphonate (Dowfax 2A1) is introduced together with 0.48 parts of nonylphenol(9x)ethylene oxide (Slovafol 909) in 50 parts of demineralized water. 2.22 parts of divinylbenzene (content 65 mass $ DVB) are added with stirring. A mild stream of nitrogen is introduced below the surface of the dispersion, and the mixture is heated to 65° C. 0.12 parts of solid ammonium persulphate is added; after stirring for 10 min, a solution of 0.06 part of potassium pyrosulphite in one part of water is added during 5 min, and the mixture is stirred at 65° C. for another 15 min. After that a solution of 5.77 parts of methacrylic acid in 6 parts of demineralized water is added to the dispersion in the reactor at a regular rate with constant stirring and introducing a stream of nitrogen during 80–90 min. After completion of the dosage of the solution the dispersion is heated to 70° C. and stirred for another 180 min.

In the meantime a solution of 2.42 parts of sodium hydroxide in 5 parts of water is prepared. On cooling of the dispersion to 25° C. the solution of sodium hydroxide is slowly added to the stirred dispersion until pH=6.5–7.0.

A dilute milky dispersion of the copolymer of divinylbenzene and sodium polymethacrylate is obtained.

EXAMPLE 2

Latex prepared as in example 1 is further treated in a spray drier. On switching on the ventilator the air at the inlet is heated to 160° and the dispersion is dosed at a sufficient rate onto an atomizer at its highest revolutions. The dosage of the dispersion is adjusted to proceed at such a rate that the air temperature at the outlet behind the cyclone is 80°–90° C.

In the vessel under the separator 10 parts of dry hydrophilic powder are obtained, particle size (as determined with an electron microscope) being 0.05–5 μm. The powder does not dissolve in water, but yields with water again a stable homogeneous dispersion.

EXAMPLE 3

In the same reactor and by the same procedure as in Example 1 in a solution of 0.55 parts of Dowfax 2A1 and 0.45 parts of Slovafol 909 in 54 parts of demineralized water, emulsion copolymerization was carried out of 2.77 parts of divinylbenzene after addition of 0.14 parts of ammonium persulphate at 65° C. and addition of a solution of 0.07 parts of pyrosulphite in one part of water; after stirring for 15 min at 65° C. while introducing continuously a mild stream of nitrogen, a solution of 1.58 parts of methacrylic acid and 4.89 parts of acrylamide in 8 parts of demineralized water was dosed below the surface during 90–100 min. The mixture was heated to 70°–75° C. and stirred for another 180 min. The mixture was then concentrated by azeotropic distillation with benzene to dry matter 40% by wt. Latex thus obtained is particularly suited for introducing hydrophilic filler into materials based on rubber, polyurethane and other latexes.

EXAMPLE 4

In the same reactor as in Example 1 emulsion copolymerization was carried out of ethylenedimethacrylate and 2-hydroxyethyl methacrylate.

To a solution of 0.6 parts of a 30% aqueous solution of sodium laurylglycol ester sulphonate (Etoxon EPA) and 0.1 part of Slovafol 909 in 45 parts of demineralized water, 2 parts of glycol dimethacrylate were added, and the mixture was heated to 60° C. with stirring and introducing a mild stream of nitrogen below the surface. 0.07 parts of solid ammonium persulphate was added; after stirring for 10 min a solution of 0.03 potassium pyrosulphite in 0.5 parts of water was added during 5 min, and after 12 min a solution of 2.6 parts of glycol methacrylate in 3 parts of water was dosed for 90 min. The stirring of the dispersion at 60° C. and introducing of a mild stream of nitrogen were continued for another 300 min.

The dilute liquid white dispersion thus obtained was diluted with a demineralized water 1:1 and evaporated on a spray drier by a procedure described in Example 2.

4.5 parts of powder were obtained, strongly swelling in water, insoluble, but forming a stable copolymer latex.

EXAMPLE 5

By using the same apparatus as described in Example 1, copolymerization of styrene, methacrylic acid and acrylamide was carried out.

14 parts of demineralized water were introduced into the reactor, 0.8 parts of a 30% aqueous solution of sodium alkyl acylpolyethyleneglycol ether sulphate (Etoxon AF-5) and 0.5 parts of Slovafol 909 were dissolved in said water. 5.7 parts of styrene were added to the solution, the mixture was heated with stirring to 70° C. while introducing a mild stream of nitrogen, and 0.15 parts of solid ammonium persulphate was added. The dispersion was stirred for 10 min. and then 0.08 parts of sodium pyrosulphite dissolved in one part of water were dozed during 5 min. The mixture was stirred for 20 min and a solution of 2.36 parts of methacrylic acid and 1.94 parts of acrylamide in 5 parts of water was added to the dispersion at a regular rate during 100–110 min. The mixture was heated to 80° C. and the stirring and introduction of nitrogen were continued for another 240 min.

A dilute, homogeneous, very stable dispersion was obtained.

EXAMPLE 6

By employing the same procedure as in the aforesaid examples, an emulsion polymer was preoared from methyl methacrylate, methacrylic acid and N-dimethylaminoethyl acrylate.

In 30 parts of water containing dissolved tensides (0.6 parts of a solution of ETOXON EPA and 0.15 parts of Slovafol 909), 3 parts of methyl methacrylate were emulsified and the mixture was heated to 65° C. 0.07 parts of ammonium persulphate were added, and after stirring and introducing nitrogen for 10 min, a solution of 0.03 parts of potassium pyrosulphite in one part of water was added during 10 min. After 15 min a solution of 0.5 parts of methacrylic acid and 1 part of N-dimethylaminoethanol acrylate in 10 parts of demineralized water was added at 65° C. during 80 min. At this temperature the stirring of the dispersion was continued for another 180 min. On cooling the dispersion to 25° C. a solution of 0.23 parts of NaOH in 4 parts of water was added with stirring until pH=7 was reached.

The dilute fine white latex thus obtained was evaporated on the spray drier described in Example 2 and yielded a white fine hygroscopic powder.

We claim:

1. A procedure for preparation of hydrophilic fillers for plastics and rubbers based on high-molecular weight compounds, insoluble in water, obtained by the copolymerization of unsaturated monomers insoluble in water and monomers soluble in water, especially suitable for the manufacturing of hygienic synthetic leathers, wherein a charge consisting of a monomer or a mixture of monomers insoluble in water selected from the group consisting of divinylbenzene, ethyleneglycol dimethacrylate and ethyleneglycol diacrylate is first subjected to emulsion polymerization until the conversion of the double bonds thereof is 40 to 70% complete, after which an addition consisting of a monomer or a mixture of monomers, soluble in water, selected from the group consisting of acrylic acid, methacrylic acid, and aminoesters and monoesters of polyhydric alcohols and amides thereof or their aqueous solution is added to the polymerizing dispersion, wherein the mass ratio of monomers insoluble and monomers soluble in water varies from 2:1 to 1:3 whereafter on completion of the polymerization the carboxylic groups, if desired, are neutralized in the latex-dispersion thus obtained.

2. A procedure as set forth in claim 1, wherein the latex dispersion after the neutralization, if desired, of the carboxylic groups is concentrated to a dry matter content of 20–70% by wt.

3. A procedure for preparation of hydrophilic fillers for plastics and rubbers, which fillers are especially suitable for the manufacturing of hygienic synthetic leathers, wherein a charge consisting of a monomer or mixture of monomers insoluble in water and selected from the group consisting of divinylbenzene, ethyleneglycol dimethacrylate and ethyleneglycol diacrylate, is subjected to emulsion polymerization until the conversion of 40% to 70% of the double bonds thereof has been effected, after which an addition consisting of a monomer or mixture of monomers soluble in water and selected from the group consisting of acrylic acid, methacrylic acid and aminoesters and monoesters of polyhydric alcohols and amides thereof is added to the polymerizing dispersion at a constant rate such that the molecules thereof can be bound on the latex particles already formed during the polymerization of the charged monomers, the mass ratio of monomers insoluble and monomers soluble in water varying from 2:1 to 1:3.

4. The procedure of claim 3 wherein, when the amount of said monomer insoluble in water is from 2 to 2.77 parts by weight and the amount of said monomer or mixture of monomers soluble in water is from 2.6 to 6.47 parts by weight, the time for said constant rate of addition of said monomers soluble in water ranges from 80 to 100 minutes.

5. A fine hygroscopic powder, capable of reversible sorption of water vapor and in the form of particles predominantly spherical in shape and having a size of 0.05–10 $\mu$m, comprising a polymer formed by emulsion polymerization of a charge consisting of a monomer or mixture of monomers insoluble in water selected from the group consisting of divinylbenzene, ethyleneglycol dimethacrylate and ethyleneglycol diacrylate, to which polymer has ben grafted by emulsion polymerization an additional charge consisting of a monomer or mixture of monomers soluble in water selected from the group consisting of acrylic acid, methacrylic acid and aminoesters and monoesters of polyhydric alcohols and amides thereof, wherein the mass ratio of monomers insoluble and monomers soluble in water varies from 2:1 to 1:3.

* * * * *